(12) United States Patent
Gournay et al.

(10) Patent No.: US 7,693,708 B2
(45) Date of Patent: Apr. 6, 2010

(54) SYSTEM AND METHOD FOR ADAPTIVE TRANSMISSION OF COMFORT NOISE PARAMETERS DURING DISCONTINUOUS SPEECH TRANSMISSION

(75) Inventors: Philippe Gournay, Sherbrooke (CA); Milan Jelinek, Sherbrooke (CA); Steven C. Greer, Rowlett, TX (US)

(73) Assignee: Nokia Corporation, Espoo (FI)

( * ) Notice: Subject to any disclaimer, the term of this patent is extended or adjusted under 35 U.S.C. 154(b) by 965 days.

(21) Appl. No.: 11/424,365

(22) Filed: Jun. 15, 2006

(65) Prior Publication Data

US 2006/0293885 A1 Dec. 28, 2006

Related U.S. Application Data

(60) Provisional application No. 60/691,420, filed on Jun. 17, 2005.

(51) Int. Cl.
G10L 19/12 (2006.01)
(52) U.S. Cl. ........................................ 704/201; 455/570
(58) Field of Classification Search ................. 704/201; 455/570
See application file for complete search history.

(56) References Cited

U.S. PATENT DOCUMENTS

| 5,812,965 | A | 9/1998 | Massaloux |
| 6,081,732 | A | 6/2000 | Suvanen et al. |
| 6,477,176 | B1 | 11/2002 | Hamalainen et al. |
| 6,519,260 | B1 * | 2/2003 | Galyas et al. .......... 370/395.42 |
| 6,810,273 | B1 * | 10/2004 | Mattila et al. ................ 455/570 |
| 6,823,303 | B1 | 11/2004 | Su et al. |
| 7,027,496 | B2 | 4/2006 | Tapaninen |
| 7,092,365 | B1 * | 8/2006 | Tackin et al. ................. 370/286 |
| 7,171,246 | B2 * | 1/2007 | Mattila et al. ................ 455/570 |
| 7,203,638 | B2 * | 4/2007 | Jelinek et al. ................ 704/201 |
| 7,539,615 | B2 * | 5/2009 | Koistinen et al. ........... 704/226 |
| 7,587,211 | B2 * | 9/2009 | Zeng et al. ................... 455/501 |

FOREIGN PATENT DOCUMENTS

| EP | 1 204 093 A1 | 5/2002 |
| EP | 1 229 520 A2 | 8/2002 |
| WO | WO 00/31719 | 6/2000 |
| WO | WO 03/034599 | 4/2003 |

OTHER PUBLICATIONS

3rd *Generation Partnership Project; Technical Specification Group Services and System Aspects; Discontinuous Transmission (DTX) for Enhanced Full Rate (EFR) speech traffic channels (Release 6)*; 3GPP TS 46.081 V6.0.0 (Dec. 2004); 2004; 13 pages; 3GPP Organizational Partners (ARIB, CCSA, ETSI, TI, TTA, TTC).

(Continued)

*Primary Examiner*—Susan McFadden
(74) *Attorney, Agent, or Firm*—Alston & Bird LLP

(57) ABSTRACT

Apparatus is provided that includes at least one entity for transmitting speech signals in a discontinuous transmission mode including transmitting speech frames interspersed with frames including comfort noise parameters during periods of speech pauses. The entit(ies) include a first entity for estimating a current noise value. In addition, the apparatus includes a second entity for selectively controlling a rate at which the frames including comfort noise parameters are transmitted during the periods of speech pauses based upon the estimated current noise value.

36 Claims, 5 Drawing Sheets

OTHER PUBLICATIONS

Benyassine, et al., "ITU-T Recommendation G.729 Annex B: A Silence Compression Scheme for Use with G.729 Optimized for V.70 Digital Simultaneous Voice and Data Applications," *IEEE Communications Magazine,* vol. 35, No. 9, pp. 64-73, Sep. 1, 1997.

European Search Report for European Application No. EP 06779723.3 dated Jun. 23, 2009.

Taiwanese Search Report for Taiwanese Application No. TW 95121673 dated May 8, 2009.

\* cited by examiner

SYSTEM AND METHOD FOR ADAPTIVE TRANSMISSION OF COMFORT NOISE PARAMETERS DURING DISCONTINUOUS SPEECH TRANSMISSION

CROSS REFERENCE TO RELATED APPLICATION(S)

This application claims the benefit of U.S. Provisional Patent Application No. 60/691,420, entitled: System and Method for Adaptive Transmission of Silence Descriptor (SID) Frames, Comfort Noise (CN) Parameter Messages or the Like, and filed Jun. 17, 2005, the content of which is incorporated herein in its entirety.

FIELD OF THE INVENTION

Exemplary embodiments of the present invention relate generally to systems and methods for discontinuous speech transmission and, more particularly, relate to systems and methods for adaptively transmitting comfort noise parameters during discontinuous speech transmission.

BACKGROUND OF THE INVENTION

Discontinuous transmission (DTX) is used in mobile communication systems to switch the radio transmitter off during speech pauses. The use of DTX saves power in the mobile station and increases the time required between battery recharging. It also reduces the general interference level and thus improves transmission quality. During speech pauses, however, the background noise that is typically transmitted with the speech also disappears if the channel is completely cut off. The result is an unnatural sounding audio signal (silence) at the receiving end of the communication.

Instead of completely switching the transmission off during speech pauses, a number of techniques have been developed whereby parameters that characterize the background noise are generated and sent in Silence Descriptor (SID) frames over the air interface at a low rate. These parameters, often referred to as comfort noise (CN) parameters, can then be used at the receive side to regenerate background noise reflecting, as well as possible, the spectral and temporal content of the background noise at the transmit side. The comfort noise parameters typically include a subset of speech coding parameters: in particular synthesis filter coefficients and gain parameters.

Conventionally, CN parameters are transmitted over the air interface at a fixed rate during speech pauses, such as shown in FIG. 1 where SID frames including these parameters are transmitted every fourth frame during inactive speech periods. More particularly, for example, in the full rate (FR) and enhanced FR (EFR) speech channels of the GSM cellular communication system, the CN parameters are transmitted at a rate of once per 24 frames (i.e., every 480 milliseconds). This means that CN parameters are updated only about twice per second. In adaptive multi-rate (AMR) and wideband AMR (AMR-WB) systems, on the other hand, the CN parameters are transmitted at a rate of once per 8 frames (i.e., every 160 milliseconds), for a CN parameter update rate of about six times per second. This low transmission rate cannot accurately represent the spectral and temporal characteristics of the background noise and, therefore, some degradation in the quality of background noise is unavoidable during DTX. Increasing the transmission rate, however, reduces the benefit of DTX in reducing the overall transmission rate of speech and CN parameters.

SUMMARY OF THE INVENTION

In view of the foregoing background, exemplary embodiments of the present invention provide an improved system and method for adaptive transmission of comfort noise (CN) parameters, such as in Silence Descriptor (SID) frames, CN parameter messages or the like (such messages being referred to herein as SID frames without loss of generality). In accordance with exemplary embodiments of the present invention, the rate at which SID frames are transmitted can be adapted or otherwise selectively controlled based upon a current noise value, such as the current speech-to-background noise (or signal-to-noise) ratio (SNR). In this regard, during operation of the mobile terminal, a terminal entity such as a voice activity detector is capable of estimating the current value of the SNR. Based upon this SNR value, then, a mobile terminal entity, such as a discontinuous transmission (DTX) transmitter (e.g., TX-DTX processor), can selectively set the rate at which the DTX transmitter transmits SID frames during a period of inactivity in a speech signal. At a high SNR (e.g., above 20 dB), for example, the TX-DTX can be configured to transmit SID frames with a lower frequency (e.g., every 50 frames) to thereby achieve a significant reduction in average data rate at the cost of only minor quality degradation. On the other hand, at a low SNR (e.g., at or below 20 dB), the TX-DTX can be configured to transmit SID frames with a higher frequency (e.g., every 12 frames) so that the comfort noise remains as natural as possible.

According to one aspect of exemplary embodiments of the present invention, an apparatus is provided that includes at least one entity for transmitting speech signals in a discontinuous transmission mode including transmitting speech frames interspersed with frames including comfort noise parameters (e.g., SID frames) during periods of speech pauses. The entit(ies) include a first entity (e.g., Voice Activity Detector—VAD) for estimating a current noise value. For example, the first entity may be adapted to estimate a current signal-to-noise ratio (SNR) or inverse SNR based upon a long-term energy of active speech, and based upon a long-term energy of background noise. Also, for example, the first entity may be adapted to estimate the current signal-to-noise ratio based upon a function of a long-term energy of active voiced speech and a long-term energy of background noise, and based upon a corrective factor applied to the function.

In addition to the first entity, the apparatus includes a second entity (e.g., TX-DTX) for selectively controlling a rate at which the frames including comfort noise parameters are transmitted during the periods of speech pauses based upon the estimated current noise value. For example, the second entity may be adapted to selectively control the rate by varying the rate between a minimum value that corresponds to a first noise value and a maximum value that corresponds to a second noise value that is lower than the first noise value (or higher than the first noise value in alternative instances). The second entity may be adapted to selectively control the rate by decreasing the rate when the estimated current noise value, such as the estimated SNR, increases, and by increasing the rate when the estimated current noise value decreases. Alternatively, in other instances, such as when the estimated current noise value comprises an estimated inverse SNR, the second entity may be adapted to selectively control the rate by increasing the rate when the estimated current noise value increases, and by decreasing the rate when the estimated current noise value decreases.

More particularly, the second entity may be adapted to calculate an interval (inverse of a rate) based upon the estimated current noise value such that the frames including comfort noise parameters are transmitted at the calculated interval. For the frames during a period of inactivity, the second entity may be further adapted to determine whether the end of a calculated interval has been reached, and transmit a frame including comfort noise parameters if the end of the calculated interval has been reached. Otherwise, if the end of a calculated interval has not been reached, the second entity may be adapted to receive direction to transmit a frame including comfort noise parameters, such as if a detected background noise-level variation exceeds a maximum variation.

According to other aspects of the present invention, methods and computer program products are provided. As indicated above and explained below, apparatuses, methods and computer program products of exemplary embodiments of the present invention may solve the problems identified by prior techniques and may provide additional benefits.

BRIEF DESCRIPTION OF THE DRAWINGS

Figure 1:
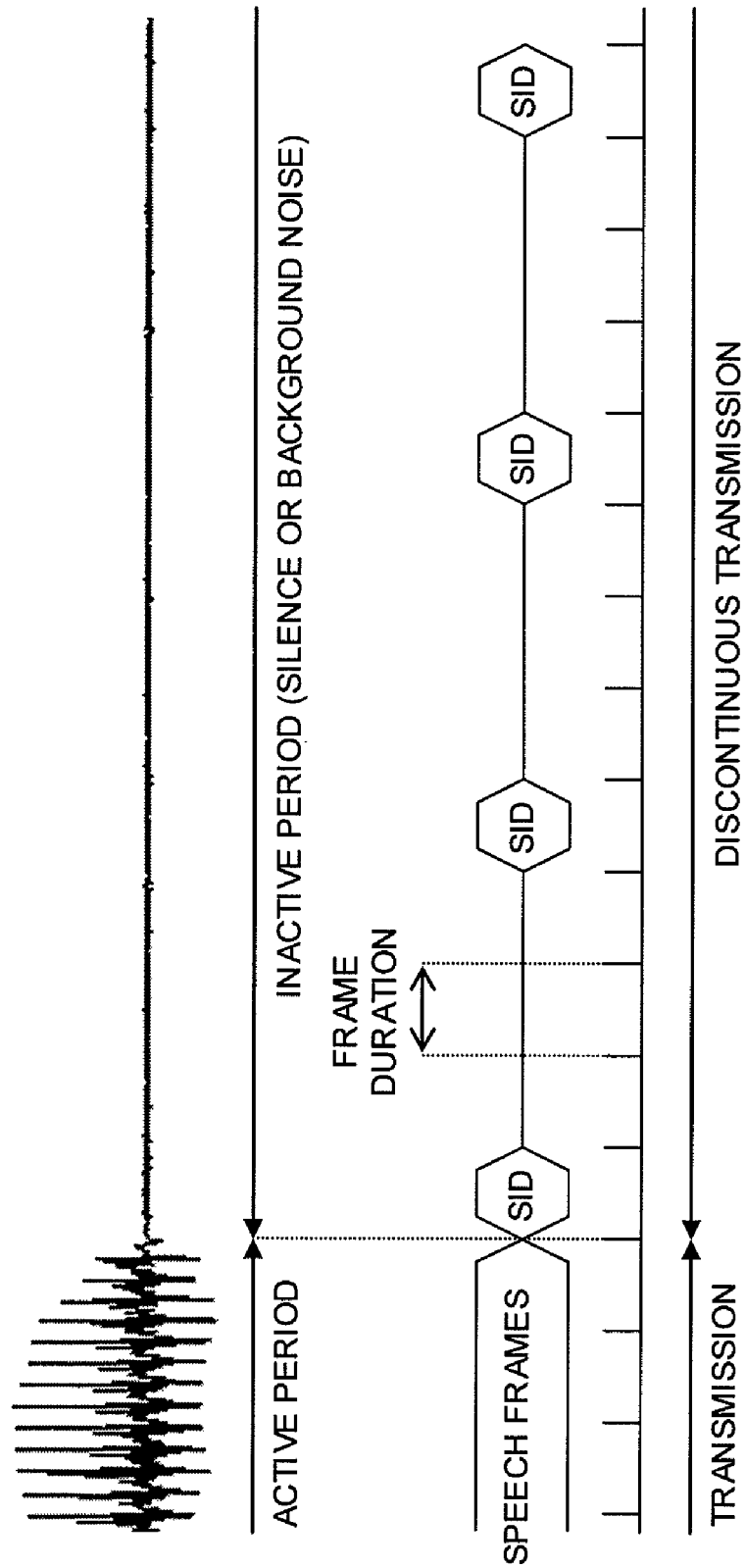
Figure 2:
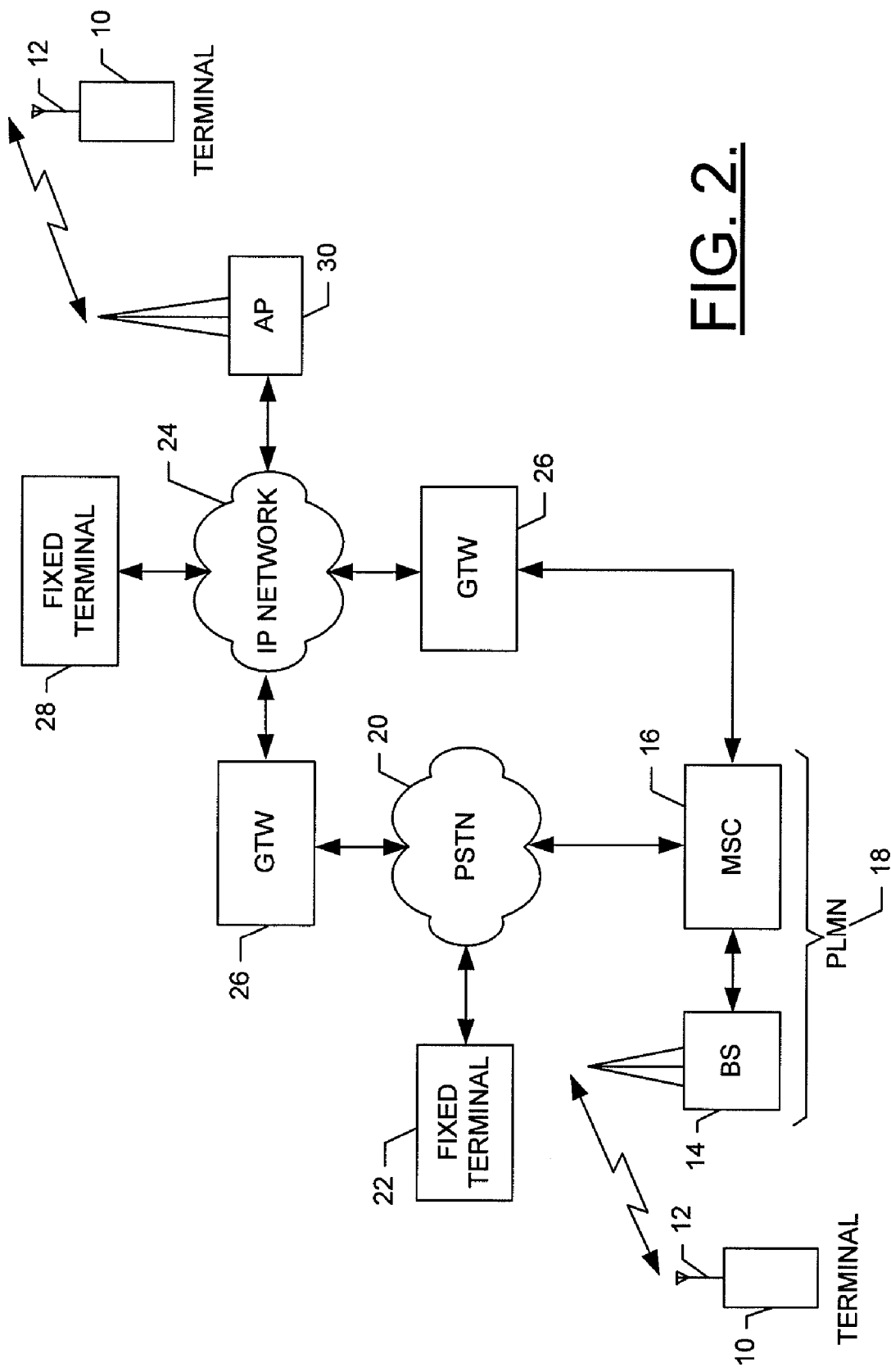
Figure 3:
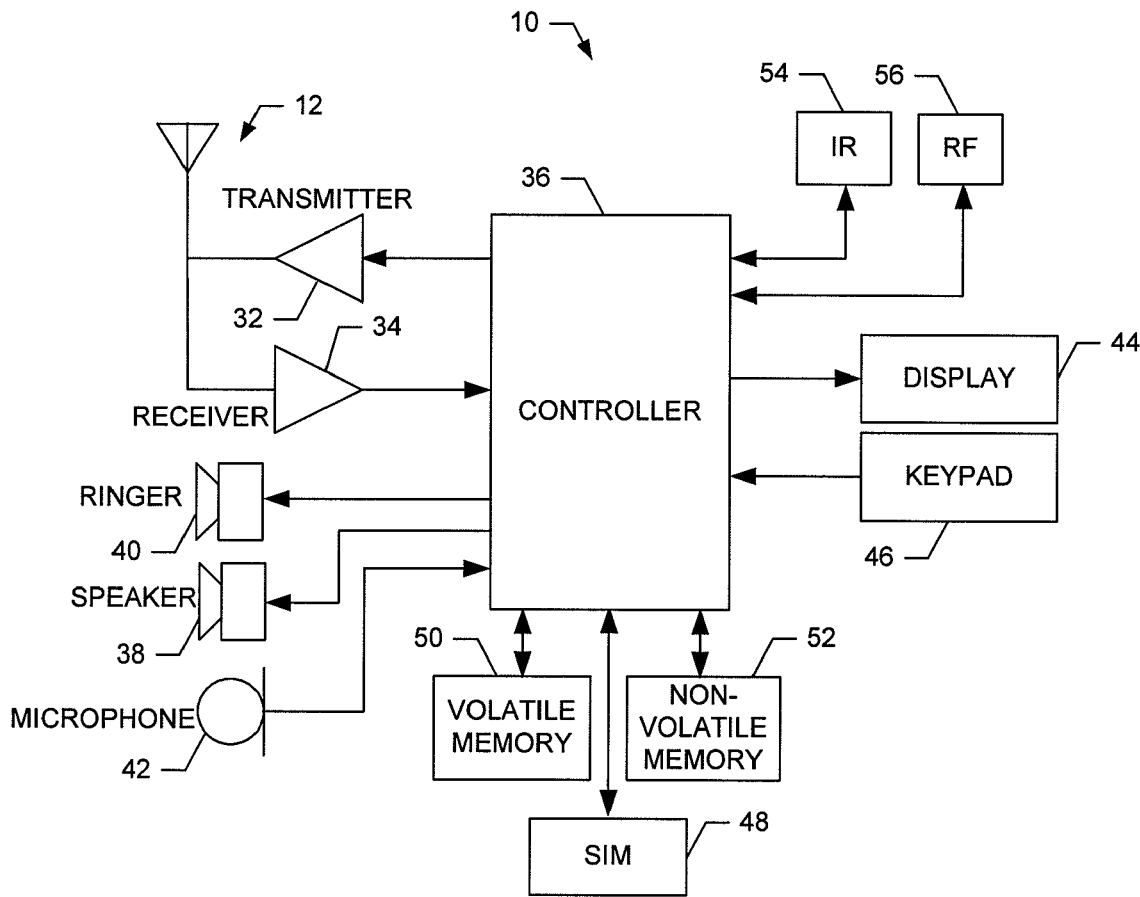
Figure 4:
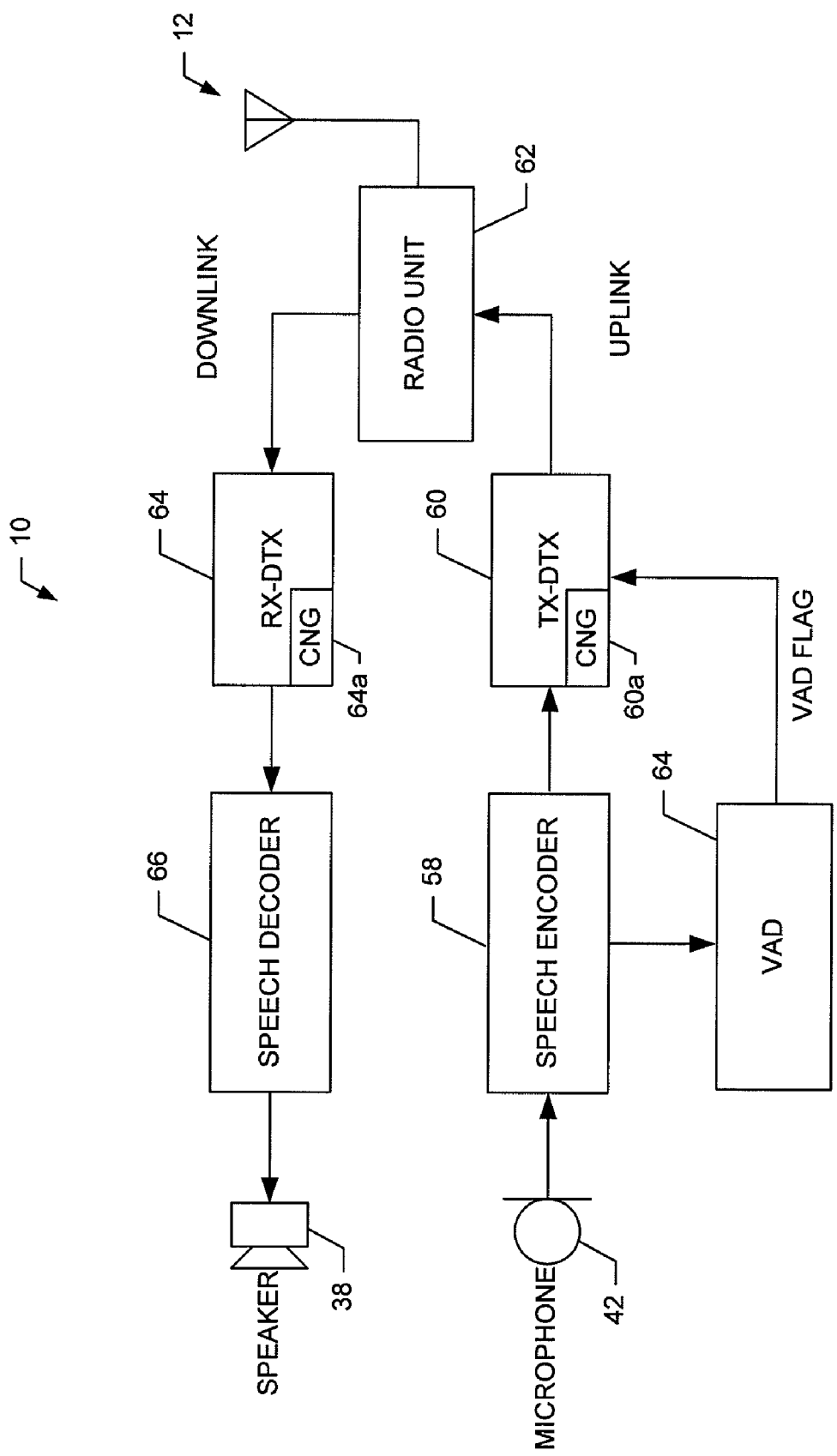
Figure 5:
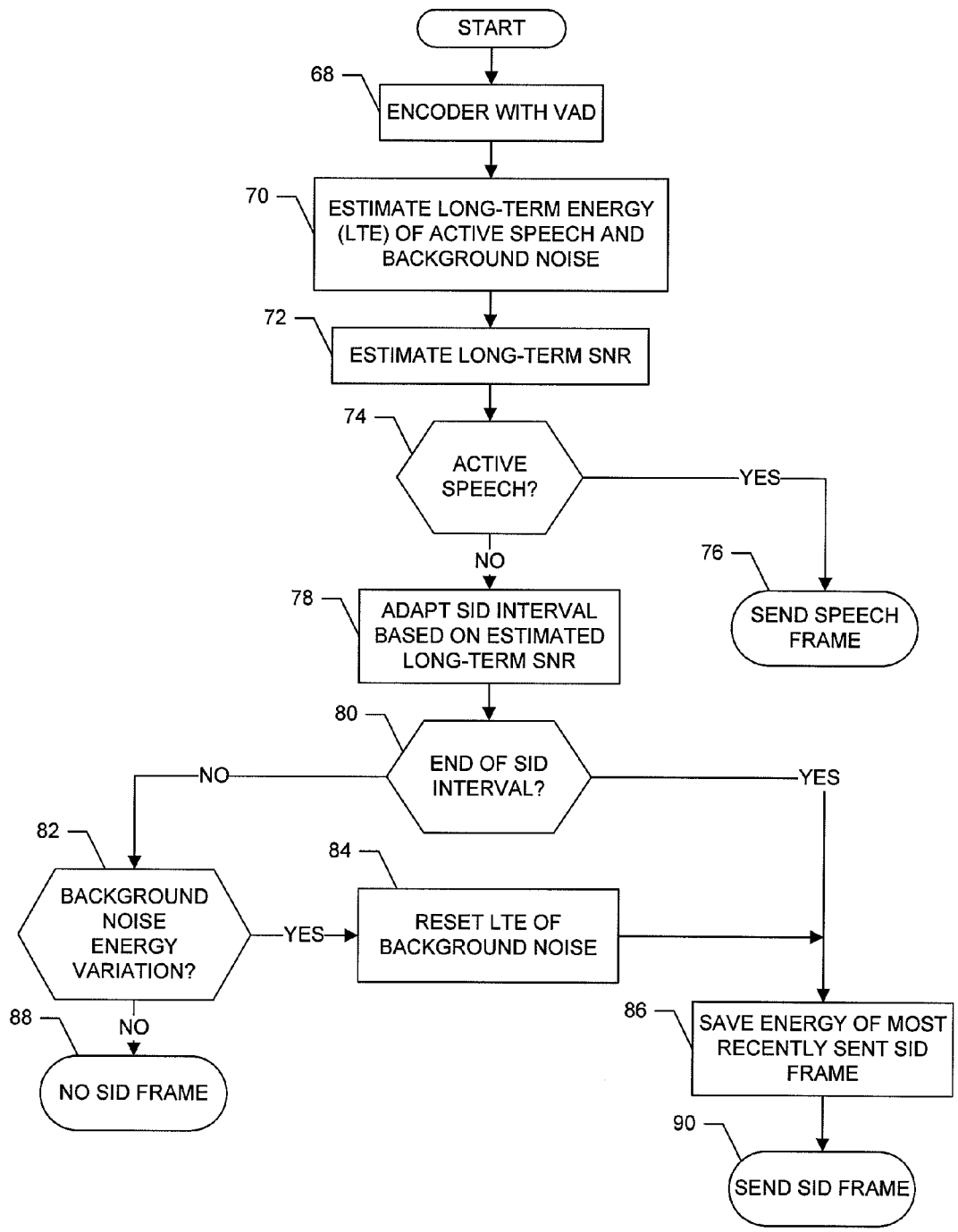

Having thus described the invention in general terms, reference will now be made to the accompanying drawings, which are not necessarily drawn to scale, and wherein:

FIG. 1 is a schematic illustration of Silence Descriptor (SID) frames being transmitted at a fixed interval during a period of inactivity during speech communication;

FIG. 2 is a schematic block diagram of a communications system according to one exemplary embodiment of the present invention including a mobile network, a public-switched telephone network and a data network;

FIG. 3 is a schematic block diagram of a mobile terminal according to one exemplary embodiment of the present invention;

FIG. 4 is a functional block diagram of a mobile terminal operating in accordance with a discontinuous transmission (DTX) technique, according to exemplary embodiments of the present invention; and FIG. 5 is a flowchart illustrating various steps in a method of adaptively transmitting comfort noise parameters in accordance with one exemplary embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 2, a functional illustration of a wireless communications network configured in accordance with exemplary embodiments of the present invention is provided. As shown in FIG. 2, the network of exemplary embodiments of the present invention includes a mobile terminal 10, such as a mobile telephone. It should be understood, however, that the mobile telephone illustrated and hereinafter described is merely illustrative of one type of mobile terminal that would benefit from exemplary embodiments of the present invention and, therefore, should not be taken to limit the scope of the present invention. While several embodiments of the mobile terminal are illustrated and will be hereinafter described for purposes of example, other types of mobile terminals, such as portable digital assistants (PDAs), pagers, tracking devices, laptop computers and other types of voice and text communications systems, can readily employ exemplary embodiments of the present invention. Moreover, the system and method of exemplary embodiments of the present invention will be primarily described in conjunction with mobile communications applications. But the system and method of exemplary embodiments of the present invention can be utilized in conjunction with a variety of other applications, both in the mobile communications industries and outside of the mobile communications industries.

As shown, a mobile terminal 10 includes an antenna transducer 12 for transmitting and receiving signals in accordance with a number of different wireless communication techniques. More particularly, for example, the mobile terminal can include an antenna transducer for transmitting signals to and receiving signals from a base site or base station (BS) 14 in one or more of a cellular network, personal communication services (PCS) network and the like. The base station is a part of a cellular network that includes a mobile switching center (MSC) 16 and other units required to operate the cellular network. The MSC is capable of routing calls and messages to and from the mobile terminal when the mobile terminal is making and receiving calls. The MSC also controls the forwarding of messages to and from the mobile terminal when the terminal is registered with the cellular network, and controls the forwarding of messages for the mobile terminal to and from a message center (not shown). As will be appreciated by those skilled in the art, the cellular network may also be referred to as a Public Land Mobile Network (PLMN) 18.

The PLMN 18 is capable of providing communications in accordance with a number of different cellular communication techniques. In this regard, the PLMN is capable of operating in accordance with any of a number of first-generation (1G), second-generation (2G), 2.5G and/or third-generation (3G) communication techniques, and/or any of a number of other cellular communication techniques capable of operating in accordance with embodiments of the present invention. For example, the PLMN can be capable of operating in accordance with GSM (Global System for Mobile Communication), IS-136 (Time Domain Multiple Access—TDMA), IS-95 (Code Division Multiple Access—CDMA), cdma2000, or EDGE (Enhanced Data GSM Environment) communication techniques. Additionally or alternatively, the PLMN can be capable of operating in accordance with one or more enhanced 3G wireless communication techniques such as high rate packet data (HRPD) communication techniques including, for example, a 1XEV-DO (TIA/ELA/1S-856) and/or 1XEV-DV. Further, for example, the PLMN can be capable of operating in accordance with GPRS (General Radio Packet Service), GPRS-based (e.g., Universal Mobile Telecommunications System—UMTS) techniques or the like.

The MSC 16, and thus the PLMN 18, can be coupled to a Public Switched Telephone Network (PSTN) 20 that, in turn, is coupled to one, or more typically, a plurality of circuit-switched fixed terminals 22, such as wireline and/or wireless telephones. The PSTN is capable of providing audio communications in accordance with any of a number of different techniques. For example, the PSTN may operate in accordance with Time Division Multiplexing (TDM) techniques, such as 64 Kbps (CCIT), and/or Pulse Code Modulation (PCM) techniques, such as 56 Kbps (ANSI).

The PLMN 18 (via the MSC 16) and the PSTN 20 can be coupled to, electrically connected to, or otherwise in electrical communication with a packet-switched network, such as an Internet Protocol (IP) network 24. Whereas the PLMN and the PSTN can be directly coupled to the IP network, in one embodiment the PLMN and PSTN are indirectly coupled to the IP network by respective gateways (GTW's) 26. The IP network may be coupled to one or more packet-switched fixed terminals 28. Additionally, the IP network may be coupled to one or more wireless access points (AP's) 30, to which devices such as a terminal 10 may be coupled. In this regard, the terminal can be coupled to the AP in any of a number of different manners, such as in accordance with a low power radio frequency (LPRF) technique, such as wireless local area network (WLAN) (e.g., IEEE 802.11), Bluetooth and/or ultrawideband (UWB) techniques.

Reference is now drawn to FIG. 3, which illustrates a block diagram of a mobile terminal 10 that would benefit from exemplary embodiments of the present invention. The mobile terminal includes various means for performing one or more functions in accordance with exemplary embodiments of the present invention, including those more particularly shown and described herein. It should be understood, however, that the mobile terminal may include alternative means for performing one or more like functions, without departing from the spirit and scope of the present invention. More particularly, for example, as shown in FIG. 3, the mobile terminal can include a transmitter 32, a receiver 34, and a means, such as a processor, controller 36 or the like, that provides signals to and receives signals from the transmitter and receiver, respectively. These signals include signaling information in accordance with the air interface standard of the applicable cellular system, and also user speech and/or user generated data. In this regard, the mobile terminal can be capable of operating with one or more air interface standards, communication protocols, modulation types, and access types. More particularly, the mobile terminal can be capable of operating in accordance with any of a number of first, second and/or third-generation communication protocols or the like. For example, the mobile terminal may be capable of operating in accordance with second-generation (2G) wireless communication protocols IS-136 (TDMA), GSM, and IS-95 (CDMA), and third generation protocols like 1XEV-DO and 1XEV-DV. Some narrow-band AMPS (NAMPS), as well as TACS, mobile terminals may also benefit from the teaching of this invention, as should dual or higher mode phones (e.g., digital/analog or TDMA/CDMA/analog phones).

It is understood that the controller 36 includes the circuitry required for implementing the audio and logic functions of the mobile terminal 10. For example, the controller may be comprised of a digital signal processor device, a microprocessor device, and various analog to digital converters, digital to analog converters, and other support circuits. The control and signal processing functions of the mobile terminal are allocated between these devices according to their respective capabilities. The controller thus also includes the functionality to convolutionally encode and interleave message and data prior to modulation and transmission. Further, the controller may include the functionality to operate one or more software programs, which may be stored in memory.

The mobile terminal 10 also comprises a user interface including a conventional earphone or speaker 38, a ringer 40, a microphone 42, a display 44, and a user input interface, all of which are coupled to the controller 36. The user input interface, which allows the mobile terminal to receive data, can comprise any of a number of devices allowing the mobile terminal to receive data, such as a keypad 46, a touch display (not shown) or other input device. In embodiments including a keypad, the keypad includes the conventional numeric (0-9) and related keys (#, *), and other keys used for operating the mobile terminal.

The mobile terminal 10 can also include memory, such as a subscriber identity module (SIM) 48, a removable user identity module (R-UIM) or the like, which typically stores information elements related to a mobile subscriber. In addition to the SIM, the mobile terminal 10 can include other memory. In this regard, the mobile terminal can include volatile memory 50, such as volatile Random Access Memory (RAM) including a cache area for the temporary storage of data. The mobile terminal can also include other non-volatile memory 52, which can be embedded and/or may be removable. The non-volatile memory can additionally or alternatively comprise an EEPROM, flash memory or the like. The memories can store any of a number of pieces of information, and data, used by the mobile terminal to implement the functions of the mobile terminal. For example, the memories can include an identifier, such as an international mobile equipment identification (IMEI) code, capable of uniquely identifying the mobile terminal, such as to the MSC 16.

The mobile terminal 10 can further include an infrared transceiver 54 or another local data transfer device so that data can be shared with and/or obtained from other devices such as via one or more AP's 30. The sharing of data, as well as the remote sharing of data, can also be provided according to a number of different techniques. For example, the mobile terminal may include one or more radio frequency transceivers 56 capable of sharing data with other radio frequency transceivers, and may thereby function as WLAN and/or WAN interfaces as described herein. Additionally, or alternatively, the mobile terminal may share data using Bluetooth brand wireless technology developed by the Bluetooth Special Interest Group.

Reference is now made to FIG. 4, which illustrates a functional block diagram of the mobile terminal 10 operating in accordance with a discontinuous transmission (DTX) technique, in accordance with exemplary embodiments of the present invention. As shown, a microphone 42 converts an acoustic sound into an electric signal, which is supplied to a speech encoder 58. The speech encoder carries out speech encoding to a lower rate, such as in a manner producing one or more speech parameters that are transferred to a TX-DTX processor 60. The TX-DTX processor, in turn, forwards the speech frames every time in the normal transmission mode regardless of whether the signal produced by the microphone comprises speech or mere background noise. The speech frames are transmitted to a radio unit 62, which comprises a transceiver and the other components and functions required by the radio path. The radio unit transmits the speech frames as a radio frequency uplink signal over the radio interface to a BS 14, AP 30 or the like.

The mobile terminal 10 may be commanded to the DTX mode with a command transmitted by the BS 14. When the mobile terminal is in the DTX mode, a Voice Activity Detector (VAD) 64 analyzes the signal produced by the microphone 42 to determine whether the signal produced by the microphone 42 comprises speech or mere background noise. As defined in accordance with GSM communication techniques, for example, the VAD more particularly analyzes the energy and spectral changes of the signal produced by the microphone. Based upon its analysis, the VAD generates a VAD flag, whose state indicates whether the signal includes speech (VAD=1) or mere background noise (VAD=0). When the VAD flag is set (VAD=1), the function that is responsible for discontinuous transmissions on the transmitting side, that is, the TX-DTX processor 60 (Transmit DTX) transmits normal speech frames. When the VAD flag is not set (VAD=0), on the other hand, the TX-DTX transmits SID (Silence Descriptor)

frames that include information on the background noise for comfort noise (CN) to be generated on the receiving side.

When the state of the VAD flag changes from being set to not being set, that is, when no speech is detected in the signal, the TX-DTX 60 switches from transmitting encoded speech frames delivered by the speech encoder 58 to generating SID frames after a predetermined number of frames required for calculating the parameters for the background noise. A SP (speech) flag in the control bits of the frames delivered by the TX-DTX to the radio unit 62 indicates whether the transmitted frame comprises a normal speech frame (SP=1) or a SID frame (SP=0). The radio unit 62 transmits one SID frame (SP=0) after the last speech frame, following which the transmission to the radio path is terminated. The TX-DTX processor 60 continues generating SID frames containing noise information to the radio unit while the VAD flag is not set, and the radio unit continues to forward these frames to the radio path for updating the noise parameters on the receiving side. In various instances, these SID frames that update the noise parameters may be referred to as comfort noise updating (CNU) frames. When the VAD 64 later detects speech from the parameters of the speech encoder 58, the VAD sets the VAD flag to thereby direct the TX-DTX processor to restart continuous transmission of speech frames (SP=1).

The TX-DTX processor 60 generates SID frames representing the background noise by either converting speech frames delivered by the speech encoder 58 into SID frames, or by employing or otherwise communicating with a separate comfort noise generator (CNG) encoder in the mobile terminal (not shown). For example, the TX-DTX processor may select as the noise parameters those parameters from the normal speech parameters that provide information on the level and spectrum of the background noise. Mean values corresponding to the duration of a number of speech frames can be further included within such parameters. Each speech frame may contain a corresponding number of parameters from which a value in common corresponding to the duration of those speech frames may be calculated. These noise parameters may then be transmitted to the radio path in SID frames in the manner described above. Instead of transmitting all of the parameters otherwise transmitted when the VAD 64 detects speech, a portion of those parameters may be replaced with a SID code word including one or more binary zero bits. The other unnecessary parameters may also be coded to the value zero.

On the receiving side of the mobile terminal 10, the radio unit 62 receives a radio frequency downlink signal (including a downlink frame) from a BS 14, AP 30 or the like. The radio unit separates the downlink frame from the downlink signal, and applies the downlink frame to a RX-DTX processor 64 (Receive DTX) that is responsible for the discontinuous transmission on the receiving side. In case the mobile terminal is in the normal transmission mode, the RX-DTX processor forwards the received speech frames to a speech decoder 66, which carries out speech decoding of the received parameters. A decoded speech signal is converted at a speaker 38 into an acoustic signal. In case the mobile terminal is in the DTX mode, the RX-DTX processor processes the frames received from the radio unit in a number of different manners, typically depending on whether the downlink frame includes a normal speech frame or a SID frame. In this regard, the RX-DTX can determine the frame type based upon the SP flag of the frame. When the SP flag is set (SP=1), the RX-DTX forwards the speech frames to the speech decoder. When the SP flag is not set (SP=0), the RX-DTX shifts into a state in which it either delivers to the speech decoder 66 encoded speech frames generated based on the received comfort noise (CN) parameters conveyed by the SID frames, or employs an internal CNG decoder or otherwise communicates with a separate CNG decoder in the mobile terminal (not shown) to provide a signal directly to the speaker 38. The RX-DTX may update the parameters used in generating comfort noise every time it receives a new SID frame. The speech decoder decodes the speech frames including "noise" by producing a signal that is converted by the speaker into acoustic background noise similar to that occurring on the transmitting side. The fluctuation between speech conveyed by the background noise and complete silence, which may be very unpleasant to the listener is thus avoided in the DTX mode.

From the descriptions of a mobile terminal 10 with respect to FIGS. 3 and 4, it should be appreciated that the elements of the mobile terminal may be implemented by a number of various means, such as hardware and/or firmware, alone and/or under control of a computer program product. Generally, then, the mobile terminal can include one or more logic elements or entities for performing various functions of one or more client application(s). As will be appreciated, the logic elements can be embodied in any of a number of different manners. In this regard, the logic elements performing the functions of the mobile terminal can be embodied in an integrated circuit assembly including one or more integrated circuits integral or otherwise in communication with the mobile terminal or more particularly, for example, the controller 36 of the mobile terminal. The design of integrated circuits is by and large a highly automated process. In this regard, complex and powerful software tools are available for converting a logic level design into a semiconductor circuit design ready to be etched and formed on a semiconductor substrate. These software tools automatically route conductors and locate components on a semiconductor chip using well established rules of design as well as huge libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As indicated in the background section, in conventional DTX techniques, SID frames including comfort noise (CN) parameters are transmitted over the air interface at a fixed rate during speech pauses, such as shown in FIG. 1. At low transmission rates, however, the spectral and temporal characteristics of the background noise may not be accurately represented, leading to some degradation in the quality of background noise. Increasing the transmission rate, however, may reduce the benefit of DTX in reducing the overall transmission rate of speech and SID frames. Accordingly, in accordance with exemplary embodiments of the present invention, the transmission rate of SID frames during speech pauses, periods of speech inactivity or the like can be selectively controlled based upon a current noise value, such as the current speech-to-background noise (or signal-to-noise) ratio (SNR). As such, exemplary embodiments of the present invention are capable of better realizing the benefits of reducing the average data rate with reduced detriment to signal quality.

Reference is now made to FIG. 5, which illustrates various steps in a method of adaptively transmitting CN parameters (described without loss of generality as being transmitted in SID frames), in accordance with one exemplary embodiment of the present invention. As shown in block 68, during speech transmission, the speech encoder 58 of the mobile terminal 10 carries out speech encoding of signals produced by the microphone 42, while the VAD 64 analyzes those signals, such as in the manner explained above. As also explained above, based upon the signal analysis, the VAD can generate a VAD flag such that the TX-DTX 60 transmits normal speech frames when the VAD flag is set (VAD=1), as shown in blocks 74 and 76. When the VAD flag is not set, however, the TX-DTX transmits SID (Silence Descriptor) frames that include information on the background noise for comfort noise (CN) to be generated on the receiving side.

To transmit SID frames in accordance with exemplary embodiments of the present invention, the VAD 64 (or another mobile terminal entity) can calculate or otherwise estimate a SNR (or inverse SNR), such as in any of a number of different manners. In one exemplary embodiment, for example, the VAD estimates the SNR (expressed, e.g., in decibels) based upon the long-term energy of active (voiced and unvoiced) speech ($LTE_{active}$) or only active voiced speech ($LTE_{voiced}$), and based upon the long-term energy of background noise ($LTE_{inactive}$). In such instances, the VAD can estimate the SNR by first estimating the long-term energies, such as in any of a number of different manners, as shown in block 70. For example, the VAD can estimate the long-term energy of the background noise from frames labeled by the VAD as "inactive" (VAD=0). In contrast, the VAD can estimate the long-term energy of active speech from frames labeled as "active" (VAD=1). Alternatively, the VAD can estimate the long-term energy of active speech from only voiced "active" frames. In such instances, the VAD may apply a corrective factor to the energy of such voiced frames to thereby obtain the energy of active speech.

More particularly, for example, the VAD 64 (or other mobile terminal entity) can estimate the long-term energy of the background noise or active speech by directly averaging the energy of a certain number of frames belonging to the same activity class (i.e., inactive, active, etc.). To take into account the possible evolutions of the level of those two signals, however, the VAD may also implement a recursive approach. For a recursive estimation of the long-term energy, then, typical estimation equations based on the energy of the current frame FrameEnergy can be expressed as follows:

$$LTE_{inactive} = \text{alpha} \times LTE_{inactive} + (1-\text{alpha}) \times \text{FrameEnergy}, \quad (1)$$

for the energy of inactive frames (when the current frame is inactive); and $$LTE_{voiced} = \text{alpha} \times LTE_{voiced} + (1-\text{alpha}) \times \text{FrameEnergy}, \quad (2)$$

for the energy of voiced frames (when the current frame is voiced).

In equations (1) and (2), alpha represents a forgetting factor typically having a value between 0 and 1, which may be fixed or variable (e.g., based upon the energy evolution). More particularly, for example, the value alpha can be selected as 0.99 for increasing noise level or decreasing speech level (slow adaptation), or as 0.90 for decreasing noise level or increasing speech level (fast adaptation).

Having estimated the long-term energy of active or voiced speech ($LTE_{active}$ or $LTE_{voiced}$) and background noise ($LTE_{inactive}$), the VAD 64 can calculate or otherwise estimate the current SNR value based upon the respective long-term energies, as shown in block 72. When the VAD estimates the long-term energy of active speech, for example, the VAD can calculate the current SNR in accordance with the following equation (expressed in dB):

$$SNR(n) = 10.0 \log_{10}(LTE_{active}/LTE_{inactive}) \quad (3)$$

On the other hand, when the VAD estimates the long-term energy of voiced speech, the VAD can directly apply a corrective factor to the SNR estimated only using the long-term energy of voiced frames, such as in accordance with the following equation:

$$SNR(n) = 10.0 \log_{10}(LTE_{voiced}/LTE_{inactive}) - \text{Delta}, \quad (4)$$

In equation (4), Delta represents a SNR bias. The Delta SNR bias may be set in any of a number of different manners, but in one exemplary embodiment, Delta is set to 28 dB, a value previously determined experimentally as the ratio between the long-term energy of voiced frames and the long-term energy of active frames.

Before the TX-DTX 60 transmits a SID (Silence Descriptor) frame during a period of inactivity (VAD=0), the TX-DTX (or another mobile terminal entity) can adapt the rate of transmitting SID frames to the current SNR value, such as by linearly varying the rate between a minimum value that corresponds to a high SNR value (or low inverse SNR value), and a maximum value that corresponds to a low SNR value (or high inverse SNR value). The rate of transmitting SID frames is the inverse of the interval with which the SID frames are transmitted. In this regard, the TX-DTX can adapt the interval $SID_{Interval}$ to the current SNR value, or otherwise calculate the interval based upon the current SNR value, as shown in block 78. In accordance with one adaptation technique, for example, the value of $SID_{Interval}$ can be linearly varied between a minimum interval value ($INT_{MIN}$) that corresponds to a low SNR value ($SNR_{LOW}$), and a maximum interval value ($INT_{MAX}$) that corresponds to a high SNR value ($SNR_{HIGH}$). More particularly, for example, the $SID_{Interval}$ value can be adapted to the current SNR value as follows:

$$SID_{Interval} = INT_{MIN} + \frac{(INT_{MAX} - INT_{MIN}) \times (SNR(n) - SNR_{LOW})}{SNR_{HIGH} - SNR_{LOW}} \quad (6)$$

where $INT_{MIN} \leq SID_{Interval} \leq INT_{MAX}$. Although the values $INT_{MIN}$, $SNR_{LOW}$, $INT_{MAX}$ and $SNR_{HIGH}$ can be selected in any of a number of different manners, in one exemplary embodiment, those values can be selected as follows:

$INT_{MIN} = 12$ $SNR_{LOW} = 10$ dB $INT_{MAX} = 50$ $SNR_{HIGH} = 25$ dB

Irrespective of exactly how the $SID_{Interval}$ value is adapted to the current SNR value, the TX-DTX 60 (or another mobile terminal entity) can determine, for the frames during a period of inactivity, whether to transmit a SID frame at that instance or otherwise skip the frame based on the $SID_{Interval}$ value. More particularly, for example, for the frames during a period of inactivity, the TX-DTX can first determine if the end of the current interval between two consecutive SID frames has been reached, as shown in block 80. In this regard, if the number of frame periods that has elapsed since the TX-DTX transmitted the last SID frame is greater than or equal to the value $SID_{Interval}$, the TX-DTX can transmit a new SID frame, as shown in block 88.

In addition, the VAD 64 (or another mobile terminal entity) can perform a number of steps to detect fast and/or important variations of the background noise level, such as between SID intervals (e.g., when the end of the current SID interval has not been reached) as shown in block 80. More particularly, for example, the VAD can detect fast and/or important variations of the background noise level in accordance with the following condition:

$$10.0 \log_{10}(\text{FrameEnergy}) - 10.0 \log_{10}(\text{FrameEnergy}_{LastSID}) > \text{MAX}_{ENER\_VAR}, \quad (7)$$

where FrameEnergy$_{LastSID}$ represents the energy of the last SID frame transmitted by the TX-DTX. Also in the preceding equation, MAX$_{ENER\_VAR}$ represents the maximum energy variation, which may have a typical value of 4.0 dB. Alternatively, the energy measures in condition (7) can be replaced by their long-term energy counterparts to avoid updating the CNG model on a localized energy burst of the background noise, such as in accordance with the following condition (8):

$$10.0 \log_{10}(\text{LTE}_{inactive}) - 10.0 \log_{10}(\text{LTE}_{inactive\_LastSID}) > \text{MAX}_{ENER\_VAR}, \quad (8)$$

where LTE$_{inactive\_}$LastSID represents the long-term energy of the last SID frame. Then, if condition (7) (or condition (8)) is met, the VAD can direct the TX-DTX (the TX-DTX receiving direction) to transmit a new SID frame (see block 88). Otherwise, the current inactive frame is skipped and the TX-DTX does not transmit a new SID frame, as shown in block 86.

As also shown, when the VAD 64 (or other mobile terminal entity) detects a fast and/or important variation, the VAD can, but need not, reset the long-term energy of the background noise LTE$_{inactive}$ to the energy of the current frame FrameEnergy, as shown in block 82. Also, in those instances whereby the TX-DTX 60 is directed to transmit a new SID frame, the energy of the last transmitted SID frame FrameEnergy$_{LastSID}$ (for condition (7)) or LTE$_{inactive\_}$LastSID (for condition (8)) can, but need not, be reset to the energy of the current frame FrameEnergy, as shown in block 84.

As indicated above, the TX-DTX 60, VAD 64 and other mobile terminal entities perform the steps described above for each frame of an encoded signal. Before first operation of those entities, however, a number of internal variables used by the VAD and/or the TX-DTX may be initialized for subsequent use. For example, both the long-term energy of voiced and inactive frames LTE$_{voiced}$ and LTE$_{inactive}$ may be initialized to a default value (e.g., 0). The energy of the last SID frame FrameEnergy$_{LastSID}$ (for condition (7)) or LTE$_{inactive\_}$LastSID (for condition (8)) may be initialized to a default value (e.g., 0). Also, the SID interval value SID$_{Interval}$ may be initialized to a default value (e.g., 8).

Further, to make sure that enough frames were taken into account in the measurement of the long-term energies LTE$_{voiced}$ and LTE$_{inactive}$, and consequently of the SNR, the VAD 64 may use two counters of voiced and inactive frames. Those counters, in turn, may be initialized to a default value (e.g., 0). During operation, then, whenever one of the estimation equations (1) or (2) is executed, the corresponding frame counter may be incremented by one. Accordingly, the VAD may be configured to suppress adaptation of the SID interval before both counters have reached a minimum value (e.g., 50).

To verify the improved efficiency of exemplary embodiments of the present invention, consider implementation of the aforementioned embodiment of the present invention in the 3GPP2 VMR-WB (variable-rate multi-mode wideband) speech coding framework. Table 1 compares the percentage of DTX frames (i.e. frames that would not be transmitted by the TX-DTX 60) for a conventional VMR-WB encoder ("Standard DTX," 1 SID frame transmitted for every 8 inactive frames), and a VMR-WB encoder configured in accordance with the aforementioned embodiment of the present invention ("Variable DTX").

TABLE 1

| VMR-WB with | SNR = 20 dB | SNR = 10 dB | SNR = 0 dB |
|---|---|---|---|
| Standard DTX: | 51.83% | 48.95% | 7.88% |
| Variable DTX: | 56.90% | 51.75% | 8.21% |
| Gain: | +5.07% | +2.80% | +0.33 |

As can be seen, by implementing exemplary embodiments of the present invention, the TX-DTX can be controlled to transmit fewer frames during periods of inactivity, with the percentage of fewer frames increasing as the SNR increases. Thus, exemplary embodiments of the present invention are capable of further reducing the average data rate with reduced detriment to signal quality as the decrease in transmitted frames during periods of inactivity is coupled to an increase in SNR.

As explained above with reference to exemplary embodiments of the present invention, the transmission rate of SID frames during speech pauses, periods of speech inactivity or the like can be selectively controlled based upon the current SNR. It should be understood, however, that the transmission rate may be selectively controlled based upon any one or more of a number of other values representative of a current noise value, in addition to or in lieu of the current SNR. As suggested above, for example, the transmission rate of SID frames may be selectively controlled based upon a current inverse SNR. Also, for example, the transmission rate of SID frames may be selectively controlled based upon a current noise value determinable from the SNR and a noise stationarity measure, as such is well known to those skilled in the art. In such instances, the system and method may operate as explained above, although as will be appreciated, one or more of the exemplary values given above may be accordingly modified.

Although one exemplary embodiment of the present invention has been shown and described above, it should be understood that active and inactive speech may be classified and/or encoded, and/or SID frames may be generated in any of a number of different manners without departing from the spirit and scope of the present invention. In an alternative embodiment, for example, a complete "source encoder" may be positioned between the microphone 42 and the radio unit 62 for performing the functions of a speech encoder 58, TX-DTX 60 (including CNG encoder) and VAD 64. In such an embodiment, during active speech, the source encoder can feed the radio unit with one frame for each input speech frame. During inactive segments, on the other hand, the CNG encoder can feed the radio unit with one frame from time to time based on the current SNR value, such as in the same manner explained above. In this embodiment, however, the SNR calculation, SID update rate adaptation, and decision to send a new SID frame may all be accomplished by the CNG encoder.

To further understand various aspects of exemplary embodiments of the present invention, please see one or more of the following references, the contents of all of which being hereby incorporated by reference:

*Discontinuous Transmission (DTX) for Enhanced Full Rate (EFR) Speech Traffic Channels*, 3rd Generation Partnership Project, Technical Specifications Group Services and System Aspects, 3GPP TS 46.081, December 2004;

C. B. Southcott, et al., *Voice Control of the Pan-European Digital Mobile Radio System*. Global Telecommunications Conference 1989, and exhibition *Communications Technol-*

*ogy for the 1990s and Beyond*, GLOBECOM '89, IEEE, 27-30 Nov. 1989 Pages: 1070-1074 vol. 2;

*Adaptive Multi-Rate (AMR) Speech Codec; Source Controlled Rate Operation*, 3rd Generation Partnership Project, Technical Specifications Group Services and System Aspects, 3GPP TS 26.093, March 2003; and

*Adaptive Multi-Rate-Wideband (AMR-WB) Speech Codec; Source Controlled Rate Operation*, 3rd Generation Partnership Project, Technical Specifications Group Services and System Aspects, 3GPP TS 26.193, December 2004.

According to one exemplary aspect of the present invention, the functions performed by one or more of the entities of the system, such as the mobile terminal 10, may be performed by various means, such as hardware and/or firmware, including those described above, alone and/or under control of a computer program product. The computer program product for performing one or more functions of exemplary embodiments of the present invention includes a computer-readable storage medium, such as the non-volatile storage medium, and software including computer-readable program code portions, such as a series of computer instructions, embodied in the computer-readable storage medium.

In this regard, FIG. 5 is a flowchart of systems, methods and program products according to exemplary embodiments of the present invention. It will be understood that each block or step of the flowchart, and combinations of blocks in the flowchart, can be implemented by various means, such as hardware, firmware, and/or software including one or more computer program instructions. As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

Based on the foregoing description, as read in view of the appended drawing figures, it should be apparent that some examples of the invention relate to a system capable of adaptively transmitting comfort noise (CN) parameters. Examples of the invention further relate to a method of adaptively transmitting comfort noise (CN) parameters, wherein the method comprises the steps of: (1) effectuating discontinuous transmission including at least one period of activity and at least one period of inactivity, where effectuating discontinuous transmission includes transmitting a set of at least one noise parameter at at least one instance during at least one period of inactivity; (2) estimating a current noise value; and (3) calculating an interval based upon the current noise value, where the set of noise parameter(s) are transmitted at the calculated interval.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising a processor and a memory storing executable instructions that in response to execution by the processor cause the apparatus to at least perform the following:

preparing speech signals for transmission in a discontinuous transmission mode including transmission of speech frames interspersed with frames including comfort noise parameters during periods of speech pauses;

receiving an estimated current noise value, wherein receiving an estimated current noise value comprises receiving a current signal-to-noise ratio or inverse signal-to-noise ratio; and controlling a rate at which the frames including comfort noise parameters are transmitted during the periods of speech pauses based upon the estimated current noise value.

2. An apparatus according to claim 1, wherein receiving a current signal-to-noise ratio or inverse signal-to-noise ratio comprises receiving a current signal-to-noise ratio or inverse signal-to-noise ratio that has been estimated based upon a long-term energy of active speech, and based upon a long-term energy of background noise.

3. An apparatus according to claim 1, wherein receiving a current signal-to-noise ratio or inverse signal-to-noise ratio comprises receiving a current signal-to-noise ratio or inverse signal-to-noise ratio that has been estimated based upon a function of a long-term energy of active voiced speech and a long-term energy of background noise, and based upon a corrective factor applied to the function.

4. An apparatus according to claim 1, wherein controlling the rate comprises decreasing the rate when the estimated current noise value increases, and comprises increasing the rate when the estimated current noise value decreases.

5. An apparatus according to claim 1, wherein controlling the rate comprises increasing the rate when the estimated current noise value increases, and comprises decreasing the rate when the estimated current noise value decreases.

6. An apparatus according to claim 1, wherein controlling the rate comprises varying the rate between a minimum value that corresponds to a first noise value and a maximum value that corresponds to a second noise value that is lower than the first noise value.

7. An apparatus according to claim 1, wherein controlling the rate comprises calculating an interval based upon the estimated current noise value, the frames including comfort noise parameters being transmitted at the calculated interval, and wherein, for the frames during a period of inactivity, the memory stores executable instructions that in response to execution by the processor cause the apparatus to further perform the following:

determining whether an end of a calculated interval has been reached;

directing transmission a frame including comfort noise parameters if the end of the calculated interval has been reached; or receiving direction to prepare for transmission a frame including comfort noise parameters if the end of a calculated interval has not been reached.

8. An apparatus according to claim 7, wherein receiving direction comprises receiving direction to transmit a frame including comfort noise parameters if a detected background noise-level variation exceeds a maximum variation.

9. An apparatus comprising:

at least one means for preparing speech signals for transmission in a discontinuous transmission mode including transmission of speech frames interspersed with frames including comfort noise parameters during periods of speech pauses, the at least one means comprising:

a first means for receiving an estimated current noise value, wherein receiving an estimated current noise value comprises receiving a current signal-to-noise ratio or inverse signal-to-noise ratio; and a second means for controlling a rate at which the frames including comfort noise parameters are transmitted during the periods of speech pauses based upon the estimated current noise value.

10. An apparatus comprising:

at least one circuit configured to prepare speech signals for transmission in a discontinuous transmission mode including transmission of speech frames interspersed with frames including comfort noise parameters during periods of speech pauses, the at least one circuit comprising:

a first circuit configured to receive an estimated current noise value, wherein the first circuit being configured to receive an estimated current noise value includes being configured to receive a current signal-to-noise ratio or inverse signal-to-noise ratio; and a second circuit configured to control a rate at which the frames including comfort noise parameters are transmitted during the periods of speech pauses based upon the estimated current noise value.

11. An apparatus according to claim 10, wherein the first circuit being configured to receive a current signal-to-noise ratio or inverse signal-to-noise ratio includes being configured to receive a current signal-to-noise ratio or inverse signal-to-noise ratio that has been estimated based upon a long-term energy of active speech, and based upon a long-term energy of background noise.

12. An apparatus according to claim 10, wherein the second circuit being configured to control the rate includes being configured to decrease the rate when the estimated current noise value increases, and includes being configured to increase the rate when the estimated current noise value decreases.

13. An apparatus according to claim 10, wherein the second circuit being configured to control the rate includes being configured to increase the rate when the estimated current noise value increases, and includes being configured to decrease the rate when the estimated current noise value decreases.

14. An apparatus according to claim 10, wherein the second circuit being configured to control the rate includes being configured to vary the rate between a minimum value that corresponds to a first noise value and a maximum value that corresponds to a second noise value that is lower than the first noise value.

15. An apparatus comprising:

a transmitter configured to transmit speech frames during speech transmission, the transmitter being configured to transmit the speech frames interspersed with frames including comfort noise parameters during periods of speech pauses, wherein the transmitter is configured to transmit, at a controlled rate, the frames including the comfort noise parameters during the periods of speech pauses, the transmitter being configured to control the rate at one or more instances during the speech transmission based upon an estimated current noise value, and wherein the estimated current noise value comprises a current signal-to-noise ratio or inverse signal-to-noise ratio.

16. An apparatus according to claim 15, wherein the current signal-to-noise ratio or inverse signal-to-noise ratio, from which the rate is controlled, is estimated based upon a long-term energy of active speech, and based upon a long-term energy of background noise.

17. An apparatus according to claim 15, wherein the current signal-to-noise ratio or inverse signal-to-noise ratio, from which the rate is controlled, is estimated based upon a function of a long-term energy of active voiced speech and a long-term energy of background noise, and based upon a corrective factor applied to the function.

18. An apparatus according to claim 15, wherein the transmitter is configured to transmit the frames including the comfort noise parameters at a rate controlled by decreasing the rate when the estimated current noise value increases, and by increasing the rate when the estimated current noise value decreases.

19. An apparatus according to claim 15, wherein the transmitter is configured to transmit the frames including the comfort noise parameters at a rate controlled by increasing the rate when the estimated current noise value increases, and by decreasing the rate when the estimated current noise value decreases.

20. An apparatus according to claim 15, wherein the transmitter is configured to transmit the frames including the comfort noise parameters at a rate controlled by varying the rate between a minimum value that corresponds to a first noise value and a maximum value that corresponds to a second noise value that is lower than the first noise value.

21. A method comprising:

preparing speech signals for transmission in a discontinuous transmission mode including transmission of speech frames interspersed with frames including comfort noise parameters during periods of speech pauses; and at one or more instances during the speech transmission, receiving an estimated current noise value, wherein receiving an estimated current noise value comprises receiving a current signal-to-noise ratio or inverse signal-to-noise ratio; and controlling a rate at which the frames including comfort noise parameters are transmitted during the periods of speech pauses based upon the estimated current noise value, wherein preparing speech signals, receiving an estimated current noise value and controlling a rate are performed by an apparatus comprising a processor and a memory storing executable instructions that in response to execution by the processor cause the apparatus to at least perform the preparing speech signals, receiving an estimated current noise value and controlling a rate.

22. A method according to claim 21, wherein receiving a current signal-to-noise ratio or inverse signal-to-noise ratio comprises receiving a current signal-to-noise ratio or inverse signal-to-noise ratio that has been estimated based upon a long-term energy of active speech, and based upon a long-term energy of background noise.

23. A method according to claim 21, wherein controlling the rate comprises varying the rate between a minimum value that corresponds to a first noise value and a maximum value that corresponds to a second noise value that is lower than the first noise value.

24. A method according to claim 21, wherein receiving a current signal-to-noise ratio or inverse signal-to-noise ratio comprises receiving a current signal-to-noise ratio or inverse signal-to-noise ratio that has been estimated based upon a function of a long-term energy of active voiced speech and a long-term energy of background noise.

25. A method according to claim 24, wherein receiving a current signal-to-noise ratio comprises receiving a current signal-to-noise ratio for which a corrective factor has been applied to the function.

26. A method according to claim 21, wherein controlling the rate comprises decreasing the rate when the estimated current noise value increases, and comprises increasing the rate when the estimated current noise value decreases.

27. A method according to claim 21, wherein controlling the rate comprises increasing the rate when the estimated current noise value increases, and comprises decreasing the rate when the estimated current noise value decreases.

28. A method according to claim 21, wherein controlling the rate comprises calculating an interval based upon the estimated current noise value, the frames including comfort noise parameters being transmitted at the calculated interval, and wherein, for the frames during a period of inactivity, the method comprises:

determining whether an end of a calculated interval has been reached; and directing transmission of a frame including comfort noise parameters if the end of a calculated interval has been reached; or receiving direction to transmit a frame including comfort noise parameters if the end of the calculated interval has not been reached.

29. A method according to claim 28, wherein receiving direction comprises receiving direction to transmit a frame including comfort noise parameters based on a detected background noise level variation, the background noise-level variation being detected based on a logarithmic difference between an energy of a current frame and an energy of a last transmitted frame including comfort noise parameters.

30. A method according to claim 28, wherein receiving direction comprises receiving direction to transmit a frame including comfort noise parameters based on a detected background noise level variation, the background noise-level variation being detected based on a logarithmic difference between a long-term energy of background noise and a long-term energy of a last transmitted frame including comfort noise parameters.

31. A method according to claim 28, wherein receiving direction comprises receiving direction to transmit a frame including comfort noise parameters if a detected background noise-level variation exceeds a maximum variation.

32. A computer-readable storage medium having computer-readable program code portions stored therein that in response to execution by a processor cause an apparatus to at least perform the following:

preparing speech signals for transmission in a discontinuous transmission mode including transmission of speech frames interspersed with frames including comfort noise parameters during periods of speech pauses;

receiving an estimated current noise value, wherein receiving an estimated current noise value comprises receiving a current signal-to-noise ratio or inverse signal-to-noise ratio; and controlling a rate at which the frames including comfort noise parameters are transmitted during the periods of speech pauses based upon the estimated current noise value.

33. A computer-readable storage medium according to claim 32, wherein controlling a rate comprises varying the rate between a minimum value that corresponds to a first noise value and a maximum value that corresponds to a second noise value that is lower than the first noise value.

34. A computer-readable storage medium according to claim 32, wherein receiving a current signal-to-noise ratio or inverse signal-to-noise ratio comprises receiving a current signal-to-noise ratio or inverse signal-to-noise ratio that has been estimated based upon a long-term energy of active speech, and based upon a long-term energy of background noise.

35. A computer-readable storage medium according to claim 32, wherein controlling a rate comprises decreasing the rate when the estimated current noise value increases, and comprises increasing the rate when the estimated current noise value decreases.

36. A computer-readable storage medium according to claim 32, wherein controlling a rate comprises increasing the rate when the estimated current noise value increases, and comprises decreasing the rate when the estimated current noise value decreases.

* * * * *